(12) United States Patent
Dholakia et al.

(10) Patent No.: US 7,045,107 B2
(45) Date of Patent: May 16, 2006

(54) PROCESS FOR THE PRODUCTION OF NITROGEN TRIFLUORIDE

(75) Inventors: Vipul Dholakia, Macungie, PA (US); Athanasios Tsirukis, Allentown, PA (US); Anthony J. Zehnder, Bethlehem, PA (US); Richard Peter Boehme, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/945,243

(22) Filed: Sep. 20, 2004

(65) Prior Publication Data

US 2006/0062711 A1    Mar. 23, 2006

(51) Int. Cl.
*C01B 21/083* (2006.01)
(52) U.S. Cl. ..................... 423/406; 423/483
(58) Field of Classification Search ............. 423/406, 423/483
See application file for complete search history.

(56) References Cited

U.S. PATENT DOCUMENTS

| | | | | |
|---|---|---|---|---|
| 3,917,811 A * | 11/1975 | Grout et al. | ............. | 435/174 |
| 4,091,081 A | 5/1978 | Woytek et al. | | |
| 4,156,598 A | 5/1979 | Woytek et al. | | |
| 4,543,242 A * | 9/1985 | Aramaki et al. | ............. | 423/406 |
| 5,637,285 A | 6/1997 | Coronell et al. | | |
| 6,005,143 A | 12/1999 | Machado et al. | | |
| 6,010,605 A | 1/2000 | Tarancon | | |
| 6,183,713 B1 * | 2/2001 | Tokunaga et al. | ............. | 423/406 |
| 6,790,428 B1 * | 9/2004 | Tsirukis et al. | ............. | 423/483 |
| 6,908,601 B1 * | 6/2005 | Satchell et al. | ............. | 423/406 |
| 6,984,366 B1 * | 1/2006 | Syvret et al. | ............. | 423/406 |
| 2003/0152507 A1 | 8/2003 | Satchell, Jr. | | |
| 2004/0013595 A1 * | 1/2004 | Kwon et al. | ............. | 423/406 |
| 2004/0096387 A1 | 5/2004 | Syvret et al. | | |
| 2004/0120877 A1 * | 6/2004 | Satchell, Jr. | ............. | 423/406 |

FOREIGN PATENT DOCUMENTS

| EP | 0 959 040 A1 | 11/1999 |
|---|---|---|
| EP | 1 287 884 | 3/2003 |

OTHER PUBLICATIONS

Robert D. Euler, et al, Phase Behavior and Thermal Properties of the System . . . , Dept. of Chem., Univ. of MI, Aug. 1961, pp. 1291-1296.
D. Filliaudeau, et al, Temperature Dependence of the Vapor Pressures and . . . , Mat. Science Forum, vol. 73-75, 1991, pp. 669-676, (no month).
Andrzej Cybulski, et al, Structured Catalysts and Reactors, Marcel Dekker, New York, 1998, pp. 239-303, (no month).

* cited by examiner

*Primary Examiner*—Wayne A. Langel
(74) *Attorney, Agent, or Firm*—Geoffrey L. Chase

(57) ABSTRACT

The present invention is directed to an improved reaction process that allows for the achievement of excellent $NF_3$ production yields, while minimizing the amount of unreacted fluorine exiting with the process gases and minimizing the amount of liquid melt waste ($HF/NH_3$) produced by the process. The basic $NF_3$ process resides in reacting $F_2$ with an ammonium ion source, e.g., ammonium acid fluoride, under conditions for forming $NF_3$. The improvement in the process comprises:

introducing $F_2$ and said ammonium ion source cocurrently and downflow through a packed column or monolith column at a first temperature;

reacting said $F_2$ and ammonium ion source in said column; and, removing a mixture of $NF_3$ and byproducts from said column at a second temperature higher than said first temperature.

19 Claims, 1 Drawing Sheet

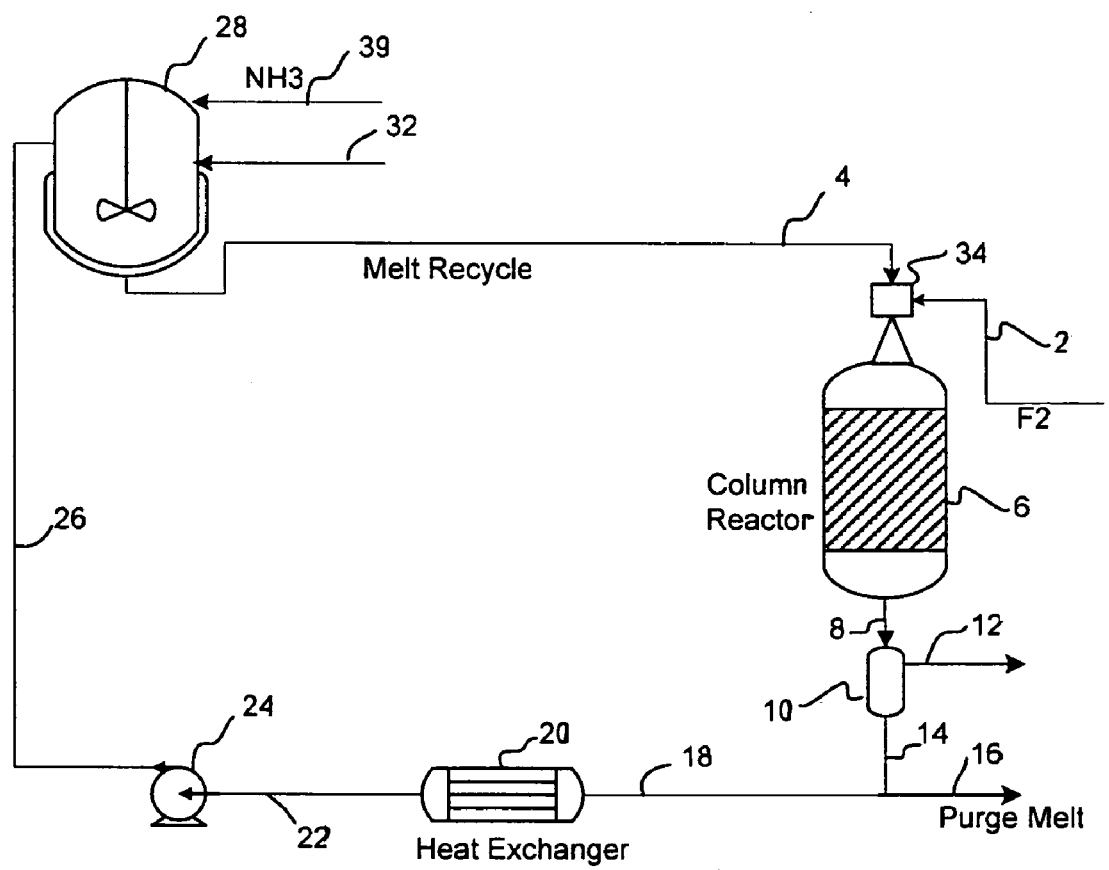

PROCESS FOR THE PRODUCTION OF NITROGEN TRIFLUORIDE

BACKGROUND OF THE INVENTION

There is currently a large and growing requirement for $NF_3$ in semiconductor manufacturing. One of the early processes for producing $NF_3$ involves the direct fluorination of ammonium ions by $F_2$ whereby gaseous $F_2$ is contacted with liquid (molten) ammonium acid fluoride (AAF) in a stirred tank reactor. The early processes operate at a molar ratio of HF to ammonia of 2.0 to 2.5 (melt ratio) in the reaction liquid and at temperatures above the melting point of ammonium bifluoride, $NH_4HF_2$, which is 127° C. Later processes for producing $NF_3$ effect the direct fluorination of ammonium bifluoride using higher $HF/NH_3$ melt ratios.

The following patents and articles describe processes for production and purification of $NF_3$.

U.S. Pat. No. 4,091,081 discloses an early process for the production of $NF_3$ by the direct fluorination of ammonium bifluoride at temperatures above 260° F. and below 400° F. in a stirred tank reactor. An $HF/NH_3$ ratio of 2 to 2.5 is maintained.

U.S. Pat. No. 4,156,598 discloses a process for the production of $NF_3$ by the direct fluorination of ammonium bifluoride. To extend the life of the adsorber columns employed in the $NF_3$ purification process, $N_2F_2$ is removed to a level below 0.03 volume percent before there is adsorption of $N_2O$ and water from the reaction product.

U.S. Pat. No. 5,637,285 discloses the production or $NF_3$ by the direct fluorination of an ammonium source, e.g., ammonium bifluoride employing a melt ratio of $HF/NH_3$ of at least 2.55 and a power input to the reaction medium of greater than 1000 watts per cubic meter of reaction medium. Representative ammonium source reactants disclosed for $NF_3$ production include compounds of the formula $NH_4H_{x-1}F_x(NH_4)_yMF_z \cdot nHF$ where x is greater than 2.55; y is 1–4; z is 2–8, and n is sufficient to maintain the reactant as a liquid. The patentees acknowledge that more HF byproduct is produced by this process than in low melt ratio prior art processes, but point out that a portion of the HF can be recovered and recycled. The patentees also note that even though higher melt ratios are employed, low levels of waste melt (1.35 lbs of ammonium acid fluoride per lb of $NF_3$) can be achieved, which level of waste melt is considerably lower than the levels which could be achieved by the process disclosed in U.S. Pat. No. 4,091,081.

US 2003/152,507(A1) discloses a process for producing $NF_3$ using a heat engine cycle with an $NF_3$ reactor to eliminate or greatly reduce the need for mechanical energy input derived from stirrers or turbines employed in the past without sacrificing high $F_2$ to $NF_3$ conversion rates. In one aspect, the reactor comprises a mixing zone and a reaction zone wherein HF is passed through a vapor jet. Mechanical energy is generated using the working fluids HF and $NH_4F(HF)_x$ which are capable of undergoing cyclic compression and expansion.

BRIEF SUMMARY OF THE INVENTION

The present invention is directed to an improved reaction process that allows for the achievement of excellent $NF_3$ production yields, while minimizing the amount of unreacted fluorine exiting with the process gases and minimizing the amount of liquid melt waste ($HF/NH_3$) produced by the process. The basic $NF_3$ process resides in reacting $F_2$ with an ammonium ion source, e.g., ammonium acid fluoride, under conditions for forming $NF_3$. The improvement in the process comprises:

introducing $F_2$ and said ammonium ion source cocurrently through a packed column or monolith column at a first temperature;

reacting said $F_2$ and ammonium ion source in said column to produce $NF_3$ and byproduct HF; and, preferably removing a reaction product containing $NF_3$ and byproducts from said column at a second temperature higher than said first temperature.

Significant advantages can be achieved by the process and these include:

an ability to significantly reduce the associated production costs and waste generation in an $NF_3$ process;

an ability to operate at low pressure drop with excellent throughput of the reactants, thus, reducing the capital costs for $NF_3$ production;

an ability to reduce or eliminate hazardous liquid melt waste produced during the reaction; and, an ability to enhance the product yield through increased fluorine conversion and selectivity, and to reduce the amount of unreacted $F_2$ in the gaseous product line.

BRIEF DESCRIPTION OF SEVERAL VIEWS OF THE DRAWINGS

The FIGURE is a flow diagram for the production of NF3.

DETAILED DESCRIPTION OF THE INVENTION

The reaction of fluorine with liquid $HF/NH_3$ mixtures (melt) produces a reaction product comprised of $NF_3$, HF, $N_2$ and other nitrogen fluorides as gaseous products and a liquid $HF/NH_3$ melt. Unfortunately, the early prior art processes that optimized the $NF_3$ production yield also increased the amount of liquid $HF/NH_3$ melt. In addition, those prior art processes often resulted in incomplete conversion of fluorine and in moderate product selectivity. Two of the problems that exist in current processes, then, is that of reducing the level of liquid melt treated as waste, i.e., the amount of liquid melt which is not recycled back through the process, and, another is that of reducing the level of unreacted fluorine that exits the process.

The invention is directed to an improvement in producing nitrogen trifluoride by the reaction of $F_2$ with an ammonium ion source, preferably ammonium acid fluoride. In this process an ammonium ion source and a fluorine containing gas are passed cocurrently, through a column, i.e., a packed column or a structured column, e.g., a monolith column, reacted and a reaction product containing $NF_3$ and byproducts including HF withdrawn from the column. As the reaction mixture passes downwardly through the column, the temperature rises along the column length due to the exothermic reaction. In addition, the acid value, i.e., the level of HF rises due to removal of ammonium ions by the reaction and the formation of by-product HF. Accordingly, the increase in HF results in an increase in the $HF/NH_3$ melt ratio in the reaction product.

In contrast to prior art processes, the present process solves the problem of waste liquid melt discharged from the process and that of low $F_2$ conversion. Conditions are controlled in the column such that the feed temperature of the $F_2$ and ammonium ion source is lower at the entrance to the packed or monolith column than that of the reaction product at the exit of the column. The temperature rise in the column is controlled within a range of from about 1 to 30° C. and preferably from about 8 to 20° C. Because the process is operated under conditions where there is a controlled temperature rise in the column, the excess HF generated by the reaction can be forced from the liquid melt into the gas phase. Excess HF, then, is removed with unreacted, gaseous fluorine and separated in a post recovery step and not with the liquid melt. By appropriate control, it is possible to reduce or eliminate the level of liquid melt regarded as waste from the process.

To facilitate an understanding of the invention, reference is made to the drawing. In the $NF_3$ process, $F_2$ is introduced via line 2 along with a liquid ammonium ion containing melt recycle via line 4 to the top end of reaction column 6. The gaseous fluorine in feed line 2 can also contain inert gases such as $N_2$ and $NF_3$. The melt ratio of the inlet feed resulting from the mixing of $F_2$ with the liquid ammonium ion melt, and expressed or calculated as $HF/NH_3$ will range from about 2.4 to 5 with preferred ranges from 2.6. to 4 and most preferred ranges from 2.6 to 3.6. The feed mixture formed by the mixing of reactants via lines 2 and 4 are introduced co-currently to establish plug flow in column 6 and generate a well dispersed gas-liquid mixture for the reaction. To facilitate gas dispersion and mixing, column 6 is filled with a random packing, such as rings or Raschig rings or structured packing, such as a monolith column. The monolith column or column filled with packing allows for sufficient pressure drop to provide the necessary energy input into the reaction mixture, to permit excellent reaction rates and excellent yields.

The reactant temperature at the inlet or feed end of column 6 preferably is at its lowest compared to the temperature in any other section of column 6. Typically, the inlet reactant feed temperature will range from 90 to 200° C., preferably from 120 to 180° C. Pressures in the column typically range from 10 psia to 500 psia with pressures from about 20 psia to 50 psia being preferred.

The reaction between $F_2$ and the ammonium ion containing melt is highly exothermic, and therefore, a substantial amount of heat is released. Temperature in the column is maintained by controlling the liquid melt ratio and liquid melt to $F_2$ reactant flow rate in the column. The liquid melt ratio rises within the column, e.g., in an amount from 0.01 to 0.5 above the initial liquid melt ratio, preferably from 0.03 to 0.1. By that it is meant that the difference between the melt ratio of the reaction product and that of the feed is from 0.01 to 0.5 and preferably from 0.03 to 0.1. Differences between the liquid melt ratios in the reaction product and that of the inlet liquid feed greater than 0.5 may result in a runaway reaction because heat is difficult to remove from such columns.

Continuing in reference to the drawing, the reaction product is withdrawn from the bottom of column 6 via line 8, often depressurized and separated in phase separator 10. A crude $NF_3$ vapor containing byproduct HF, $N_2F_2$, $N_2$, other fluoride compounds and unreacted $F_2$ is removed via line 12 and a liquid ammonium ion containing melt is removed as a bottoms fraction via line 14. Any suitable phase separation device could be used as phase separator 10 to separate the liquid and gas phases.

The exit temperature of the reaction product in line 8 is controlled to be from about 1 to 30° C. higher than the inlet temperature, so then, the exit temperature typically will be from 120 to 230° C., with a preferred range being 128 to 195° C. The temperature of the liquid melt after phase separation in line 14 typically will be lower by 1 to 20° C. than it is in line 8 due to flashing and phase separation. The pressure of the melt in line 14 then is controlled to be from 15 psia to 150 psia with a preferred range from 20 psia to 50 psia.

The reduction of waste liquid melt in the $NF_3$ process primarily results because of the temperature increase and pressure reduction (equivalent to a reaction temperature increase) near the exit of the column. At the increased temperature byproduct HF generated in the process is driven from the liquid phase, i.e., from the liquid melt to the vapor phase. (A secondary benefit of higher temperatures in the bottom section of column 6 is that of enhancing the conversion of $F_2$ gas to $NF_3$. Conversions of at least 95% can be achieved.) If it is desired to completely eliminate the amount of liquid melt waste, the process can be controlled such that the amount of HF removed with gaseous products in line 12 is equal to the amount of HF produced by the reaction. Alternatively, if one chooses to reduce but not completely eliminate the amount of liquid melt waste so as to provide an outlet for undesired impurities that may accumulate in the liquid phase; this can be accomplished by an adjustment in the melt ratio and thus temperature at the exit of the reactor. And, as stated the melt ratio at the exit can be controlled by controlling the inlet melt ratio, and particularly the ratio of $F_2$ to recycle melt introduced via lines 2 and 4. Exit temperatures typically will be within the range of 8 to 20° C. above the inlet temperature allowing for conversions of $F_2$ greater than 90%.

Gases in line 12 can be processed further downstream to recover HF. Scrubbing, adsorption or any suitable process can remove the residual $F_2$ and by-product $N_2F_2$, along with other fluoride by-products from the crude product line.

The liquid melt in line 14 generally has an $HF/NH_3$ source melt ratio higher than the melt ratio of the liquid melt feed introduced via line 4 or it can be equal to the inlet melt ratio. As stated it is preferred that the process operate with little to no waste liquid melt. However, a portion of waste liquid melt can be generated and thus, removed from the system through purge line 16 and that liquid melt regarded as waste and disposed of accordingly. It is advantageous to operate column 6 under conditions such that a small amount of liquid melt regarded as waste is created from time to time. Removal of the liquid melt waste on these occasions helps in controlling the concentration of metal salts in the recycle melt formed due to dissolution of metal from the reactor wall and packing material.

The remaining liquid melt from phase separator 10 is conveyed via line 18 to heat exchanger 20. There, the temperature of the liquid melt is lowered and thus the heat of reaction removed from the process. The cooled melt at a temperature from about 80 to 140° C. is removed via line 22 and charged to the inlet of pump 24 where the pressure of the liquid line is raised to about 20 to 50 psia. Pump 24, thus, provides the energy necessary for the system to operate.

The liquid melt at higher pressure is discharged from pump 24 and sent via line 26 to a mixing device 28, e.g., a constant stirred tankn reactor ("CSTR"), or an in-line static mixer where fresh $NH_3$ is added via line 39 and make-up HF, if required, via line 32. Optionally, $F_2$ from line 2 may be introduced at this point in whole or part rather than mixed at the top of column 6 as shown in the drawing. The reaction between $NH_3$, HF and the recycle melt in mixing device 28 is exothermic and results in an increase in temperature. The heat generated by the reaction is removed in the mixing device through a jacket or in a heat exchanger after the mixing device. The resulting liquid melt then is withdrawn from mixing device 28 and introduced into the inlet of column 6 via line 4 to complete the recycle loop.

In the present invention, any ammonium ion source can be used such that its combination with the proper amount of HF generates a liquid reaction mixture at the operating range. Examples of ammonium ion sources include ammonium fluorometallate poly(hydrogen fluorides) that can result from the reaction of ammonium fluorometallates with a certain amount of HF described by the formulas:

$$(NH_4)_y MF_z \cdot nHF \quad \quad A$$

where M is one or more elements selected from Group 1 through 18 of the Periodic Table of the Elements; y is a number that ranges from 1 to 4; z is a number that ranges from 2 to 8; and n is an amount that is sufficient to maintain the compound as a liquid in the reaction mixture; and, $$(NH_4)_y M_x A \cdot nHF \quad \quad B$$

where M is one or more elements selected from Group 1 through 18 of the Periodic Table of the Elements; x is 1 or 2, A is an anion, e.g. from the group consisting of carbonated, bicarbonate, phosphate, sulfate, nitrate, periodate, perbromate, or perchlorate; y is a number from 0 to 2 and x is a number from 1 to 3.

Examples of compounds represented by formula A include the following: $(NH_4)_2(B_{12}F_{12})$, $NH_4BrF_6$, $NH_4IF_6$, $NH_4ClF_6$, $NH_4VF_6$, $NH_4RuF_7$, $(NH_4)_3FeF_6$, $(NH_4)_2SiF_6$, $(NH_4)_3AlF_6$, $NH_4SbF_6$, $NH_4AsF_6$, $NH_4BiF_6$, $NH_4Sb_2F_{11}$, $NH_4As_2F_{11}$, $NH_4Sb_3F_{16}$ or combinations thereof. Specific examples of suitable ammonium ion compounds represented by the formula B include, but are not limited to, $NH_4NO_3$, $(NH_4)_3PO_4$, $(NH_4)_2SO_4$, $(NH_4)_2CO_3$, $NH_4HCO_3$, $NH_4HSO_4$, $NH_4IO_4$, $NH_4ClO_4$, and $NH_4BrO_4$. Of all compounds, the ammonium acid fluoride is the preferred ammonium source reactant.

The following examples are provided to illustrate various embodiments of the invention and are not intended to restrict the scope thereof.

EXAMPLE 1

Using Packed Column Co-current Reactor

In the process depicted in FIG. 1, an ammonium ion source melt containing $NH_3$ is introduced into the column 6 which is filled with a randow packing of Raschig rings having a diameter of 6 mm, and a void fraction of 0.46. Pure $F_2$ gas is also introduced into the reactor in the top section via line 2. The inlet temperature of the reactants to column 6 is 130° C. As the mixture of liquid melt and gas flows downwardly through the column, well-dispersed phases are formed due to gravitational force and through external pressure as $F_2$ reacts with $NH_3$ producing $NF_3$. The reaction between $F_2$ and $NH_3$ is exothermic resulting in an increase in the temperature of the fluid phases within the column. Near the bottom of the column the temperature is at its highest, e.g., 144° C. which results in vaporizing most or all of the HF formed during the reaction. The crude $NF_3$ in line 12 containing nitrogen by-products and unconverted $F_2$ is removed from the phase separator 10 and HF recovered from this line. The liquid (melt) line in line 14 is cooled, raised in pressure and mixed with $NH_3$ and HF before it is recycled back to column 6.

The following table summarizes the operation of the reactor:

| Co-current Reactor | |
|---|---|
| Inlet temperature (° C.) | 130 |
| Outlet temperature (° C.) | 144 |
| Temperature rise (° C.) | 14 |
| Melt ratio $NH_3$/HF | 3.6 |
| $F_2$ conversion | 98% |
| Liquid Melt Waste (lb/lb $NF_3$) | 0 |

The following table summarizes the overall material balance for the process:

| | Line 2 ($F_2$) (lbs/hr) | Line 39 ($NH_3$) (lbs/hr) | Line 12 ($NF_3$ Product) (lbs/hr) |
|---|---|---|---|
| $N_2$ | | | 2.8 |
| $F_2$ | 100 | | 2.0 |
| $NH_3$ | | 16.4 | |
| $NF_3$ | | | 53.9 |
| HF | | | 57.6 |

Design parameters of a downflow co-current reactor generally have the following requirements:

➢ $F_2$ conversion=at least 95% preferably at least 98%>
➢ 2.4≦Melt Ratio≦5.0
➢ 50° C.≦Reactor temperature≦144° C.
➢ Reactor pressure>10 psia to 500 psia; preferably 20–50 psia

EXAMPLE 2

Using Monolith Column as Cocurrent Reactor

The procedure of Example 1 is repeated with the exception that a monolith column is substituted for the packed column. The monolith column 6 itself is comprised of a structure having channels extending along its length of various shapes, e.g., circular, square, rectangular, or hexagonal. The structure may contain from 10 to 1000 cells per square inch of cross-sectional area.

A liquid motive gas ejector 34 can be provided at the inlet to monolith column 6. The liquid motive gas ejector 34 combines the liquid melt with reactant $F_2$ gas under conditions to enhance both mixing and enhanced mass transfer in the monolith column. These improvements can be attained because the liquid motive gas ejector allows one to control the pressure at which the gas-liquid mixture is presented to column. The pressure differential is expressed as pounds per square inch differential (psig). Typically a pressure differential can range from 0 to about 30 psig but preferably ranges from 0.5 to about 20 psig.

In summary, cocurrent introduction of a feed comprised of $F_2$ and an ammonium ion source at a relatively low temperature at the entrance or inlet to column 6 results in a reaction leading to high selectivity for $NF_3$. And, allowing the temperature of the reaction medium to rise in the column with the highest temperature of the reaction product being achieved at the exit of the column, a higher conversion of $F_2$ is favored. Operation in this manner results in low unconverted $F_2$ in the gaseous product line 12. The high temperature and higher acid value (melt ratio) near the exit of the column, in contrast to the inlet melt ratio, also favors increased concentration of HF in the gaseous product line 12.

The removal of HF as vapor in the gaseous product line 12 significantly reduces the liquid waste generated from the process. Using the appropriate choice of feed melt ratios, gas-liquid flow rates and the temperatures almost all the by-product HF generated by the process can be recovered as vapor without sacrificing yield of $NF_3$. The low velocity of the gas and liquid in the columns also reduces the erosion and corrosion experienced in stirred tank reactors employed heretofore in the production of $NF_3$.

The invention claimed is:

1. A process for producing $NF_3$ by the fluorination of an ammonium ion source which comprises:
    introducing a liquid mixture comprised of $F_2$ and an ammonium ion source to an inlet of a column selected from the group consisting of random packing column and structured packing column;
    passing said liquid mixture cocurrently through the column whereby reaction of said $F_2$ and ammonium ion source occurs in said column generating a reaction product comprised of $NF_3$ and byproduct HF;
    removing a reaction product containing $NF_3$ from an exit of said column;
    maintaining conditions such that the temperature of the liquid mixture comprised of reactant $F_2$ and said ammonium ion source introduced to the inlet of said column is lower than the temperature of the reaction product at the exit of said column, and thereby establishing a temperature rise in said column; and,
    recovering $NF_3$ from the reaction product.

2. The process of claim 1 wherein the ammonium ion source is selected from the group consisting of $NH_4NO_3$, $(NH_4)_3PO_4$, $(NH_4)_2SO_4$, $(NH_4)_2CO_3$, $NH_4HCO_3$, $NH_4HSO_4$, $NH_4IO_4$, $NH_4ClO_4$, and $NH_4BrO_4$; $NH_3$, $NH_4F$, $NH_4HF_2$, $NH_4Cl$, $NH_4Br$, $NH_4I$, $NH_4NO_3$, $(NH_4)_3PO_4$, $(NH_4)_2SO_4$, $(NH_4)_2CO_3$, $NH_4HCO_3$, $NH_4HSO_4$, $NH_4OSO_2F$, $NH_4OSO_2Cl$, $NH_4OSO_2CF_3$, $NH_4OSO_2CH_3$, $NH_4OC(O)CF_3$, $NH_4OC(O)CH_3$, $NH_4N(SO_2CF_3)_2$, $NH_4OIOF_4$, $NH_4OTeF_5$, $(NH_4)_2$ $(B_{12}F_{12})$, $NH_4BrF_6$, $NH_4BrF_6$, $NH_4ClF_6$, $NH_4VF_6$, $NH_4RuF_7$, $(NH_4)_3FeF_6$, $(NH_4)_2SiF_6$, $(NH_4)_3AlF_6$, $NH_4SbF_6$, $NH_4AsF_6$, $NH_4BiF_6$, $NH_4Sb_2F_{11}$, $NH_4As_2F_{11}$, and $NH_4Sb_3F_{16}$.

3. The process of claim 2 wherein the melt ratio of the liquid mixture expressed as $HF/NH_3$ is from about 2.4 to 5.

4. The process of claim 3 wherein the difference between the temperature of the reaction product at the exit of the column and that of the liquid mixture introduced to the inlet of said column is from 1 and 30° C.

5. The process of claim 4 wherein the ammonium ion source is ammonium acid fluoride.

6. The process of claim 5 wherein the column is a monolith column.

7. The process of claim 5 wherein the exit temperature is sufficiently high such that substantially no liquid melt regarded as waste is generated.

8. The process of claim 7 wherein the pressure in said column is from 10 to 500 psia.

9. The process of claim 8 wherein the temperature of the liquid melt to the inlet of said column is from 90 to 200° C.

10. The process of claim 5 wherein the melt ratio of the liquid melt to the inlet of said column is from 2.6 to 3.6 and the difference in the melt ratio of the reaction product to that of the initial melt is from 0.01 to 0.5.

11. The process of claim 10 wherein the liquid mixture is cocurrent upflow.

12. The process of claim 10 wherein the liquid mixture is cocurrent downflow.

13. In a process for producing $NF_3$ by contacting gaseous $F_2$, as the fluorine reactant, with an ammonium acid fluoride complex under conditions for generating a reaction product containing $NF_3$, the improvement which comprises:
    introducing said $F_2$ and said ammonium acid fluoride complex as a liquid melt to a column having a packing selected from the group consisting of random packing and structured packing;
    effecting reaction of said $F_2$ with said ammonium acid fluoride complex under conditions of plug flow conditions for forming $NF_3$;
    operating the column under conditions such that the temperature of the reaction product at the exit of said column is higher than the temperature of the liquid melt at the inlet of said column; and,
    recovering said $NF_3$ from the reaction product.

14. The process of claim 13 wherein the melt ratio of the liquid melt expressed as $HF/NH_3$ into the column is from 2.4 to 5.

15. The process of claim 13 wherein the melt ratio of the reaction product at the exit of the column is higher than the melt ratio of the inlet liquid melt.

16. The process of claim 15 wherein the difference between the melt ratio of the reaction product and that of the liquid melt introduced to the column is from 0.01 to 0.5.

17. The process of claim 16 wherein the conversion of $F_2$ in the reaction with ammonium acid fluoride is at least 95%.

18. In a process for producing $NF_3$ by contacting gaseous $F_2$, reactant, with an ammonium acid fluoride complex under conditions for generating a reaction product containing $NF_3$ and byproduct HF, the improvement which comprises:
    introducing said $F_2$ and said ammonium acid fluoride complex as a liquid melt mixture having a melt ratio of $HF/NH_3$ from 2.6 to 3.6 to a column selected from the group consisting of random packed column and structured packed column;
    effecting reaction of said $F_2$ with said ammonium acid fluoride complex under conditions for forming $NF_3$;
    operating the column under conditions such that the temperature of the reaction product at the exit of said column is from 8 to 20° C. higher than the temperature of the liquid melt mixture at the inlet of said column; and,
    recovering $NF_3$ from the reaction product.

19. The process of claim 18 wherein said column is a monolith column.

* * * * *

UNITED STATES PATENT AND TRADEMARK OFFICE
CERTIFICATE OF CORRECTION

PATENT NO. : 7,045,107 B2 Page 1 of 1
APPLICATION NO. : 10/945243
DATED : May 16, 2006
INVENTOR(S) : Vipul Dholakia et al.

It is certified that error appears in the above-identified patent and that said Letters Patent is hereby corrected as shown below:

Column 7, line 42

In claim 2 delete "NH4 BrF6" and insert --NH4IF6--

Signed and Sealed this

Fifth Day of September, 2006

JON W. DUDAS
*Director of the United States Patent and Trademark Office*